D. C. SCHLABACH.
TIRE TIGHTENER.
APPLICATION FILED JULY 29, 1915.

1,165,628.

Patented Dec. 28, 1915.

Inventor
D. C. Schlabach
By Watson E. Coleman
Attorney

UNITED STATES PATENT OFFICE.

DANIEL C. SCHLABACH, OF DUNDEE, OHIO.

TIRE-TIGHTENER.

1,165,628.   Specification of Letters Patent.   Patented Dec. 28, 1915.

Application filed July 29, 1915. Serial No. 42,549.

*To all whom it may concern:*

Be it known that I, DANIEL C. SCHLABACH, a citizen of the United States, residing at Dundee, in the county of Tuscarawas and State of Ohio, have invented certain new and useful Improvements in Tire-Tighteners, of which the following is a specification, reference being had to the accompanying drawings.

This invention relates to an improved tire tightener and has for its primary object to provide a device of this character whereby the tire of a wheel may be very quickly and accurately set upon the outer ends of the spokes and securely tightened in position.

It is a more particular object of the invention to provide as an improved article of manufacture, a tire tightening ring or annulus for vehicle wheels, which may be easily and cheaply manufactured in very serviceable and convenient commercial form so that the proper application of the ring to the wheel spoke is greatly facilitated.

Figure 1:
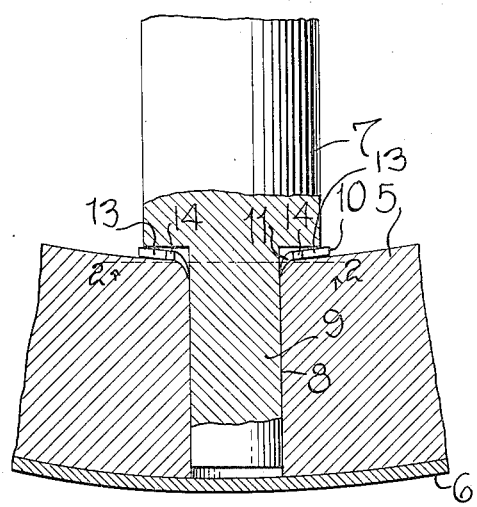
Figure 3:
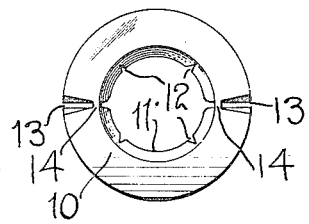
Figure 2:
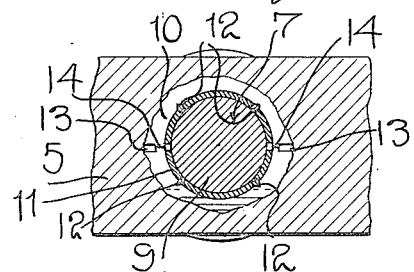

With the above and other objects in view, my invention consists in the novel features of construction, combination and arrangement of parts to be hereinafter more fully described, claimed and illustrated in the accompanying drawing, in which, Figure 1 is a sectional view through a wheel tire showing my improved sectional tightening ring applied to the spoke thereof; Fig. 2 is an enlarged sectional view taken on the line 2—2 of Fig. 1; and Fig. 3 is a plan view of the ring complete and before it is applied.

Referring in detail to the drawing, 5 designates the felly of a wheel having the usual metal tire 6 shrunk upon its outer face.

7 designates one of the wheel spokes, the felly being provided with a socket or mortise 8 to receive a cylindrical tenon 9 formed upon the end of the spoke.

My improved tire and spoke tightener, as marketed and sold, consists of a metal ring or annulus 10 having a tapering, laterally projecting annular flange 11 formed upon its inner edge. This flange is supplied with slots at a number of points, as shown at 12, and at diametrically opposite points, the ring or annulus has recesses 13 cut therein, which extend from the outer edge of the ring to a point adjacent to its inner edge, the opposite sections or halves of the ring being integrally connected, as at 14, to the inner ends of said recesses.

In the use of the invention, the integral connections 14 between the two halves of the ring, are broken and the ring sections separated. The felly of the wheel is then expanded or forced outwardly upon the spoke 10 and the ring sections inserted against the opposite sides of the spoke tenon with the tapering split flanges 11 projecting upwardly into the mortise in the wheel felly. The felly is then forced downwardly upon the end of the spoke so that the flanges 11 exert a gripping clamping pressure against the wall of the mortise at the periphery of the spoke tenon. Thus, the felly may be easily and quickly tightened between the ends of the spokes and the tire, and when the tire becomes loose, a thicker or heavier tightening ring may be applied to the spoke tenon. These rings are capable of very easy and quick application in practical use and provide a very inexpensive device for tightening the felly and its tire upon the wheel spokes and thus prolonging the use of the wheel. The ring may be very readily broken and the sections thereof separated by the user, by simply applying pressure in any desired manner upon opposite sides of the integral connections, and these connections, after being broken, have ragged or rough edges which will interlock with each other when the ring sections are applied to the spoke tenon and further act to retain the ring sections in position and hold them against relative movement.

From the foregoing description, taken in connection with the accompanying drawing, it will be seen that I have produced a very simple, reliable and serviceable device which may be manufactured at small cost and can be cheaply marketed and sold. As the devices are supplied in the form of a single metal ring and, as the ring is not separated into sections until the same is to be placed in use, the loss of one of the ring sections which would render the other useless, is obviated. The tire tightening rings may, of course, be produced in various sizes for application to different types of wheels, and while I have shown and described the preferred embodiment of the invention, it is to be understood that the same is susceptible of many minor changes therein and I, therefore, reserve the privilege of adopting all such legitimate modifications as may be fairly embodied within the spirit and scope of the invention as claimed.

Having thus fully described my invention, what I desire to claim and secure by Letters Patent is:—

As an improved article of manufacture, a tire tightening ring for wheels being cut at diametrically opposite points from its outer edge inwardly adjacent to its inner edge, the remaining integral connections at the inner ends of the cuts being adapted to be broken whereby the ring may be separated into halves for application to opposite sides of a spoke tenon.

In testimony whereof I hereunto affix my signature in the presence of two witnesses.

DANIEL C. SCHLABACH.

Witnesses:
M. CARLISLE LYDDANE,
E. M. STRUDLEY.

Copies of this patent may be obtained for five cents each, by addressing the "Commissioner of Patents, Washington, D. C."